United States Patent [19]

Hansen

[11] Patent Number: 4,967,539

[45] Date of Patent: Nov. 6, 1990

[54] METHOD AND APPARATUS FOR PRODUCING LIQUID FILLED RECEPTACLES

[76] Inventor: Bernd Hansen, Sulzbach-Laufen, Fed. Rep. of Germany

[21] Appl. No.: 404,411

[22] Filed: Sep. 8, 1989

[30] Foreign Application Priority Data

Sep. 24, 1988 [DE] Fed. Rep. of Germany ....... 3832566

[51] Int. Cl.⁵ ........................ B65B 3/02; B65B 47/08
[52] U.S. Cl. ........................................ 53/453; 53/140;
53/559; 53/561; 264/524
[58] Field of Search ................. 53/453, 559, 561, 140, 53/546, 202; 425/257, 256; 264/524

[56] References Cited

U.S. PATENT DOCUMENTS

| | | | |
|---|---|---|---|
| 3,505,705 | 4/1970 | Stroop | 53/140 X |
| 3,519,705 | 7/1970 | Pannenbecker | 53/561 X |
| 3,597,516 | 8/1971 | Harwood | 53/140 X |
| 3,863,424 | 2/1975 | Naumann | 53/140 X |
| 3,897,670 | 8/1975 | Hansen | 53/561 X |
| 4,056,914 | 11/1977 | Mnilk et al. | 53/561 X |

FOREIGN PATENT DOCUMENTS

1297525 6/1969 Fed. Rep. of Germany .
2058591 5/1972 Fed. Rep. of Germany .

*Primary Examiner*—Horace M. Culver
*Attorney, Agent, or Firm*—Roylance, Abrams, Berdo & Goodman

[57] ABSTRACT

Liquid filled receptacles are made from a thermoplastic flat tube. The flat tube is extruded from plasticized material. A strip of receptacles is formed in a molding assembly from the tube. The strip has groups of pluralities of small receptacles lying one beside the other, the receptacles preferably being ampoules. All of the receptacles of a group of receptacles are filled simultaneously by filler mandrels. The number of filler mandrels corresponds to the number of small receptacles lying adjacent to one another in any group of receptacles, while the group of receptacles are still held in the molding assembly. In the molding assembly, configurational irregularities of are formed in the side flange areas. The irregularities cooperate with a thrust device conveying the receptacle strips from the molding assembly to a punching device, and position the strips in the punching device.

10 Claims, 6 Drawing Sheets

METHOD AND APPARATUS FOR PRODUCING LIQUID FILLED RECEPTACLES

FIELD OF THE INVENTION

The present invention relates to a method and apparatus for producing liquid filled receptacles made of thermoplastic material, in which the plastic is extruded in the form of a tube. The tube is shaped by differential pressures exerted on the tube walls, shaping them to the walls of a molding assembly to form the receptacles. The receptacles are closed by welding operations applied on selected tube wall segments, and are filled with the liquid before execution of a last welding operation, which last welding operation closes off the receptacle filler opening.

The apparatus involves an extrusion head producing a tube for this method, and has at least one inside flow passage to supply flowable thermoplastic material to an extrusion slot and control means for influencing the plastic material flow through the flow passage to the extrusion slot. The extrusion slot is configured as an annular opening adapted to the cross-sectional diameter of the tube.

BACKGROUND OF THE INVENTION

Conventional methods of producing receptacles from extruded plastic tubes have proven successful in producing receptacles of comparatively large volume, i.e., for receptacles of greater than 50 ml capacity. Unfortunately, these known methods have proven less suitable for producing receptacles of small volume, e.g., of less the 50 ml.

SUMMARY OF THE INVENTION

An object of the present invention is to provide a method for especially expedient and economical production of receptacles of small volume, particularly, ampoule-like receptacles for the pharmaceutical industry.

Another object of the present invention is to provide a method for making small volume receptacles especially suitable for production in large batches.

The foregoing objects are obtained by a method for producing liquid filled receptacles of thermoplastic material, comprising of the steps of: extruding plastic material into a broad, flat tube between walls of a molding assembly, exerting differential pressure on walls of the tube such that the tube engages the mold assembly walls to form a receptacle strip having a plurality of small receptacles adjacent one another, filling each small receptacle substantially simultaneously with a liquid through a movable separate, associated filler mandrel, the filler mandrels being moved within the tube extending within the molding assembly to fill the small receptacles, and closing the small receptacles after filling by welding selected wall segments of the tube.

Thus, an especially large batch of articles can be manufactured per manufacturing time unit. The flat tube can be extruded continuously. As also is conventional in methods of this sort, movable mold parts of the molding assembly can be guided on closed, essentially circular paths, so that they form a chain of mold parts which come into engagement in the input area of the flat tube and move downward from the extrusion head.

The receptacles are filled by means of the filler mandrels extending into the inside space of the flat tube, while still in the area of the molding assembly; then they are closed. The method according to invention is especially suitable for aseptic or sterile contents. With this sort of continuous production method, there is no manual handling of open, unfilled receptacles, minimizing the danger of contamination from the outside.

High production speeds are also attainable with the method according to the present invention. The receptacle strip is discharged from the molding assembly in the form of a plastic strip with groups of several adjacent side-by-side aligned receptacles, the groups being arranged one after the other lengthwise along the plastic strip which is an especially simple and expedient arrangement for the handling and the subsequent production of individual receptacle groups, for instance so-called ampoule blocks, or individual small receptacles. The plastic strip of receptacles is fed for this purpose to a punching device for removal of the shavings from around the punched-out articles. In the punching device, the plastic strip is clamped tightly in the border area which is to be trimmed off. Then, the receptacle group is pressed out of the plastic strip, so that a plastic chain is left behind as shavings.

In one advantageous exemplary embodiment, configurational irregularities are formed on at last one of the borders of the plastic strip in the molding assembly. The borders remain as side shavings. The irregularities are, for instance, projecting cam shapes, depressions or perforations. These configurational irregularities, which are arranged in predetermined positions relative to the adjacent groups of receptacles (i.e. receptacle strips), can be used as positioning means to control the thrust movement moving the plastic strip between the molding assembly and the punching device and for the precise positioning of the plastic strip in the punch device. For instance, the plastic strip can be transported by a movable thrust member which can be brought into mechanical engagement with the strip, and into engagement with the punching device.

A further object of the invention is also to provide an extrusion head apparatus which facilitates production of a plastic tube, and which is suitable for execution of the method according to the present invention.

The foregoing object is obtained by extrusion head apparatus for producing a tube to make liquid filled receptacles of thermoplastic material, comprising at least one inner flow passage for supplying flowable thermoplastic material, and an extrusion slot in fluid communications with the flow passage. The extrusion slot is an elongated annular opening adapted to the cross-sectional configuration of the tube with substantially straight longitudinal sides connected at adjacent ends thereof by short, curved sides. A series of bores extends completely through the extrusion head apparatus and have bottom ends between the longitudinal sides of the annular opening. Longitudinally movable filler mandrels are arranged in the bores. A plurality of flow control means regulate thermoplastic material flow through the passage and selectively influence flowing zones of the thermoplastic material flow in various longitudinal segments of the longitudinal sides of the annular opening. The flow control means includes adjustment means for independently adjusting at least some of the control means relative to the other control means. Each of the flow control means are arranged in a selected position.

The plurality of control means present, the arrangement of their distribution along on the flow passage in such positional arrangements so as to influence different zones of the flow of plastic material, and the adjustability of the individual control means independent of each other facilitates an optimum synchronized and coordinated adjustment of the plastic flow emanating from the annular opening of the extrusion head. Thus, it can be guaranteed that a flat tube of considerable width is discharged at uniform velocity and of uniform wall thickness around the entire tube periphery and around the annular opening. The flat tube surrounds the filler mandrels, which extend in a series (row) one beside the other along the broader sides of the flat tube.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 6:
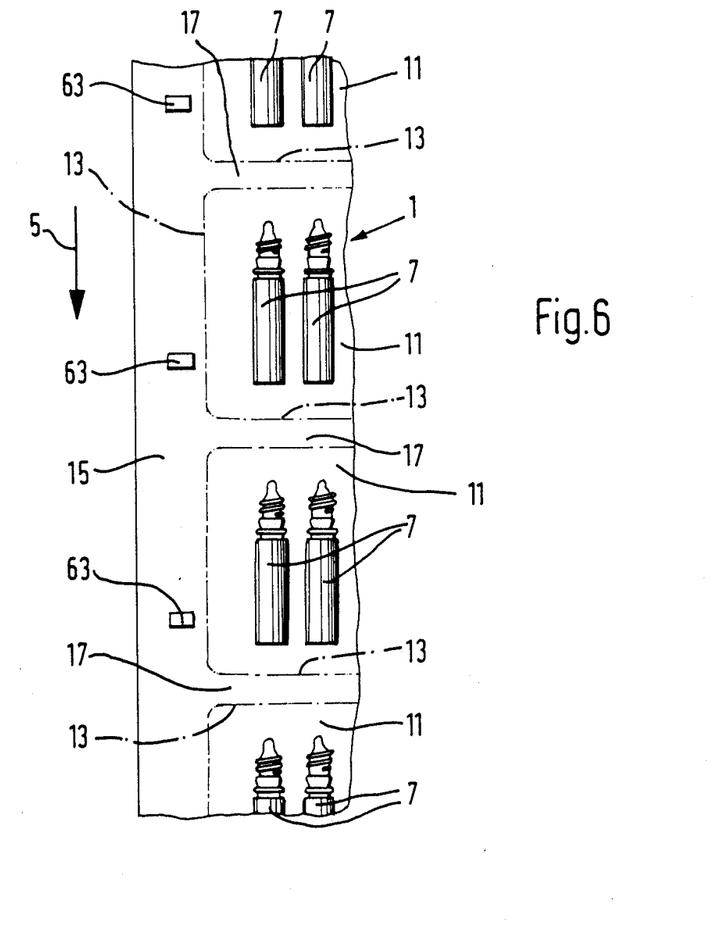
FIG. 6 is a partial side elevational view of a plastic strip of receptacles according to the present invention.

FIG. 6 shows a partial side view of a plastic strip 1 of receptacles manufactured from a broad flat tube 4 (see FIG. 7) of thermoplastic material plasticized in an extruder 2 and formed by a tube extrusion head 3. The individual parts of extrusion head 3 are shown in greater detail in FIGS. 1 to 3. Plastic strip 1 is represented in FIG. 6 in whole state, in other words, in the state which plastic strip 1 leaves a molding assembly 6, shown in simplified form in FIG. 7, with the thrust direction indicated with a directional arrow 5.

Molding assembly 6 has the movable mold parts which are conventional in known receptacle molding processes. The mold parts are conducted at a speed corresponding to the speed at which flat tube 4 moves along in the molding assembly and move in closed circular paths on cam guide rails 8. They can be connected with not shown coolant and vacuum pressure lines. Groups (see FIG. 6) of small receptacles in the form of ampoules 7 are formed by the application of vacuum pressure and shaped by vacuum deformation. Each receptacle group 11 in the present example comprises fourteen ampoules 7, of which only two ampoules 7 at one of the outside ends of each group are shown. The entire plastic strip 1 is thrust in the direction, shown in FIG. 4 by arrow 5, of a punching device 9, in which individual receptacle groups 11, in the present case blocks of ampoules with fourteen ampoules in each blocks, are punched out of plastic strip 1 along perforated punch lines 12. Each side of plastic strip 1 forms a shaving 15 along each longitudinal edge, only one edge being illustrated in FIG. 6. The shavings are formed with shaving crossbars 17 extending from side shaving 15 in a crosswise direction to the other side.

Figure 1:
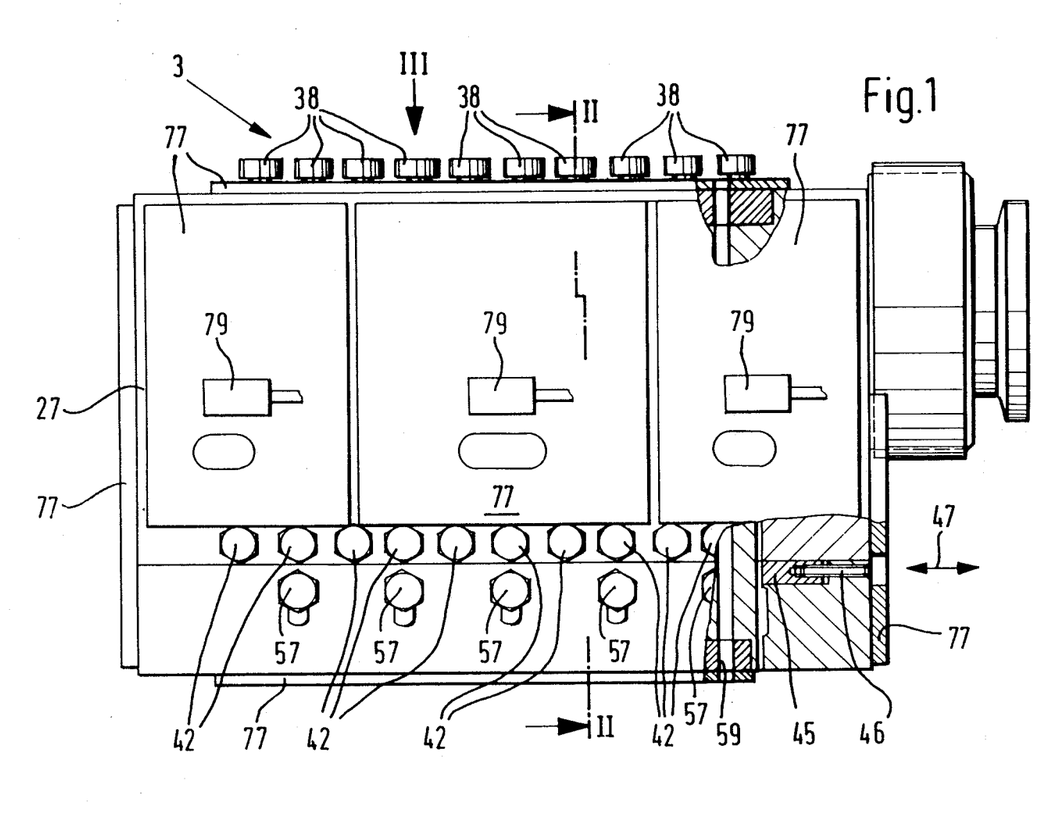
FIG. 1 is a side elevational view, partially in section, of a tube extrusion head according to one embodiment of the present invention.
Figure 2:
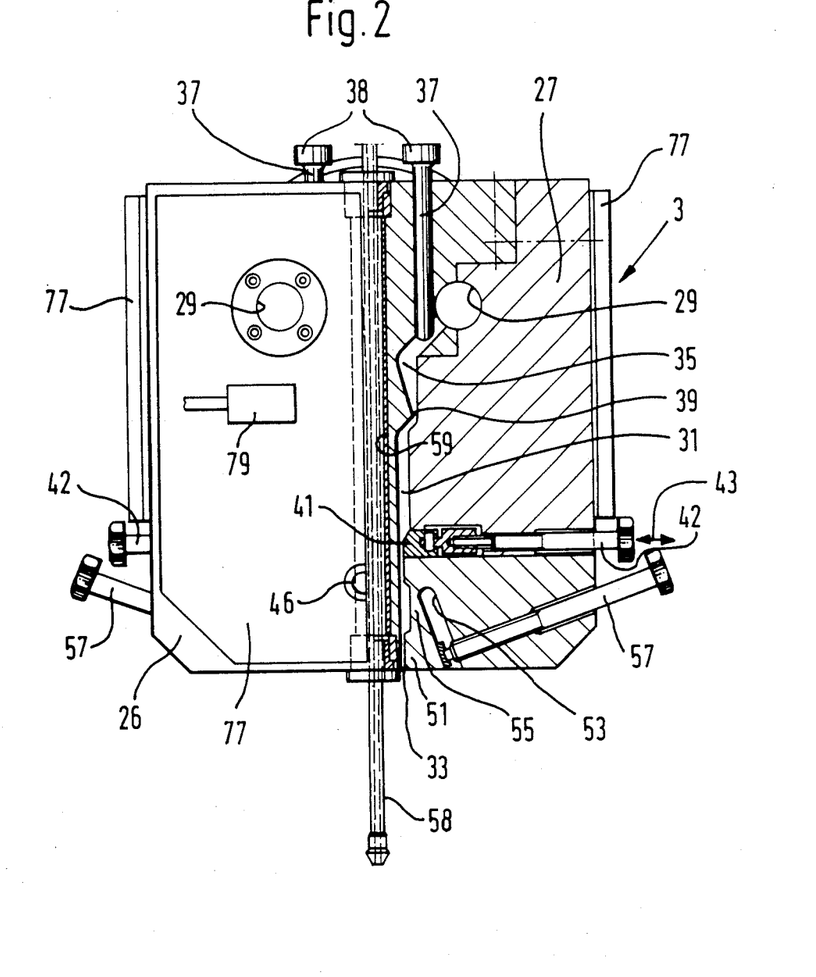
FIG. 2 is a front elevational view of the extrusion head of FIG. 1 with one half in cross section taken along line II—II of FIG. 1.
Figure 3:
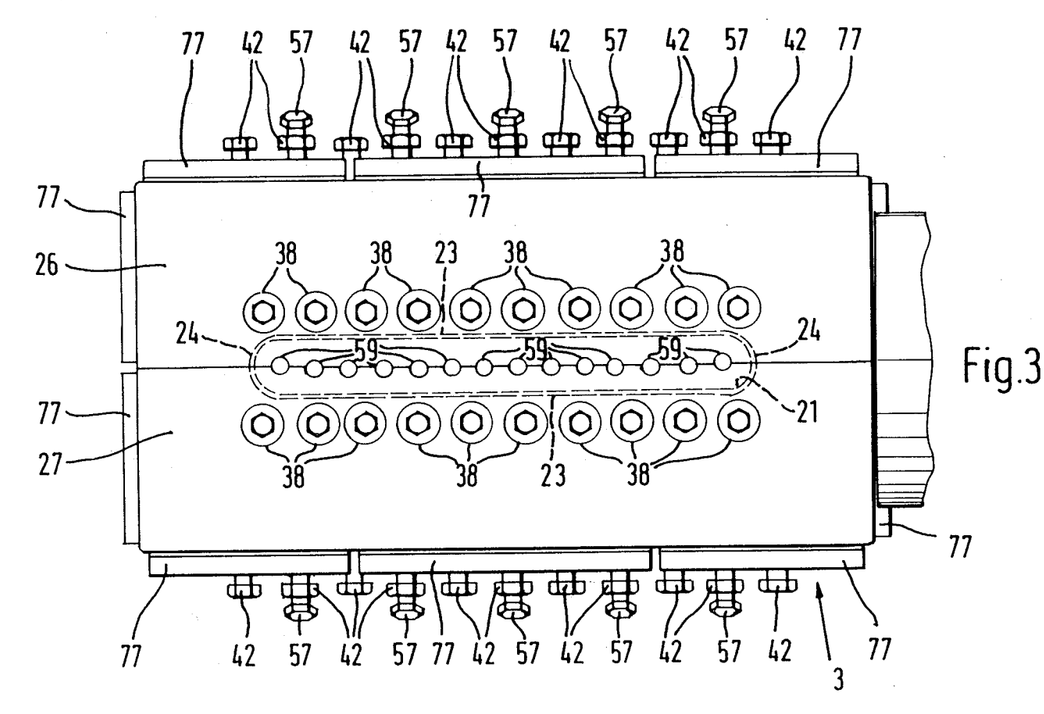
FIG. 3 is a top plan view of the extrusion head from the direction shown by arrow III in FIG. 1.

Tube extrusion head 3 for forming the flat tube 4 for the production of plastic strip 1 is explained with reference particularly to FIGS. 1 to 3. Corresponding to the flattened out cross-sectional shape of the flat tube to be manufactured, the extrusion head 3, hereinafter simply called "tube head", possesses a bottom extrusion slot 33 in the form of an annular opening 21 shown in FIG. 3 with broken lines. Annular opening 21 possesses two curved short sides or ends 24, opposite one another, and two straight longitudinal sides 23 connecting ends 24. In view of this flat, longitudinal, elongated cross-sectional shape, the tube head 3 has a body in the form of an elongated unit, composed of two halves 26 and 27 of identical configuration formed of metal and arranged in mirror image to one another. The relevant screw threads are not shown in the simplified representation of the drawings.

Each of the two halves 26 and 27 of the tube head 3 is connected through a feed bore 29 with extruder 2 to feed plasticized material. Bores 29 open into a flow passage leading to the annular opening 21. The flow passage in its bottom passage segment adjacent to annular opening 21 has an annular crevice 31 extending peripherally around annular opening 21 without interruption. To control the discharge of the plastic material from bottom slot 33 uniformly over the entire periphery of annular opening 21, flow controls means of the desired configuration are present effecting the inside flow passage within tube head 3, and are built in a selected positional arrangement. Some control means can be fixedly set. Other control means are adjustable control means. The last mentioned set of control means are adjustable independent of one another from the outside of the tube head 3.

The first group of flow control means is located in the inlet area of the flow passage, adjacent to bores 29. This group of flow control means is a series of widened flow traps 35, arranged one next to the other and one after the other in the longitudinal direction of the two halves 26 and 27 along the periphery of annular opening 21 and of the annular crevice 31. In the exemplary embodiment, each half 26 and 27 has ten flow traps 35. The small cross sectional diameter of the inlet area of each of the traps 35 can be modified to be either larger or smaller by a ram bolt 37 projecting vertically inward from the top side of tube head 3. Ram bolts 37 are longitudinally adjustable by means of an adjustable threading which is not shown. Each ram bolt 37 has an inside hexagonal head 38 to control the adjustable rotary movement. On their bottom ends, traps 35 each are connected via a constriction 39 with the annular crevice 31 passing all the way through. Constrictions 39 form a fixedly adjusted flow control means in the form of narrow throttle clearances.

At about half the flow distance between the constrictions 39 below traps 35 and slot 33, at the discharge end of annular opening 21, a series of movable sliding plugs 41 are provided as an adjustable flow control means.

Plugs 41 are arranged one behind the other in relation to the periphery or to the longitudinal sides 23 of annular opening 21, lie in a common horizontal plane and form movable throttle members. Each plug influences one single associated zone of the plastic material flow flowing in annular crevice 31. Each sliding plug 41 is adjustable in either direction by a single adjustment screw 42, as indicated by a double arrow 43. In the exemplary embodiment, eleven sliding plugs 41 are present along each longitudinal side 23 of annular opening 21, shown with setting screws 42. Still another sliding plug 45 is provided having an associated setting screw 46 in a position aligned on each short end 24 of annular opening 21. Sliding plugs 45 are adjustable in either possible direction of adjustment along a common horizontal plane, as indicated with a double arrow 47, by means of associated setting screws. The horizontal plane of sliding plug 45 is set somewhat below the horizontal plane of sliding plugs 41.

As further adjustable control means, each half 26 and 27 of the tube head 3, on its bottom border area forming longitudinal sides 23 of the annular opening 21 and providing the outside limitation of the extrusion slot 33, has border strips 51. Each border strip 51 is of one piece with the bottom segment of the respective half of the tube head 3, is coupled by a tapered connection area and is formed adjacent a recess 53. Border strips 51 are resiliently movable and can be compressed or adjusted by means of obliquely arranged compression screws 57 in the halves 26 and 27 of the tube head 3. Compressing strips 51 inward against the spring bias of the material permits a fine adjustment of the breadth of slot 33. In the exemplary embodiment shown, five compression screws 57 are provided on each half of the tube head 3, over the length of each longitudinal side 23 of annular opening 21.

Flat tube 4 is extruded from slot 33 in annular opening 21. The cross-sectional shape of the tube corresponds to the contour of annular opening 21 (FIG. 3). The tube is formed in the present exemplary embodiment into a receptacle strip 1 in molding assembly 6. The strip 1, as explained above, includes groups each comprising fourteen ampoules 7. Each ampoule is arranged one after the other.

Figure 7:
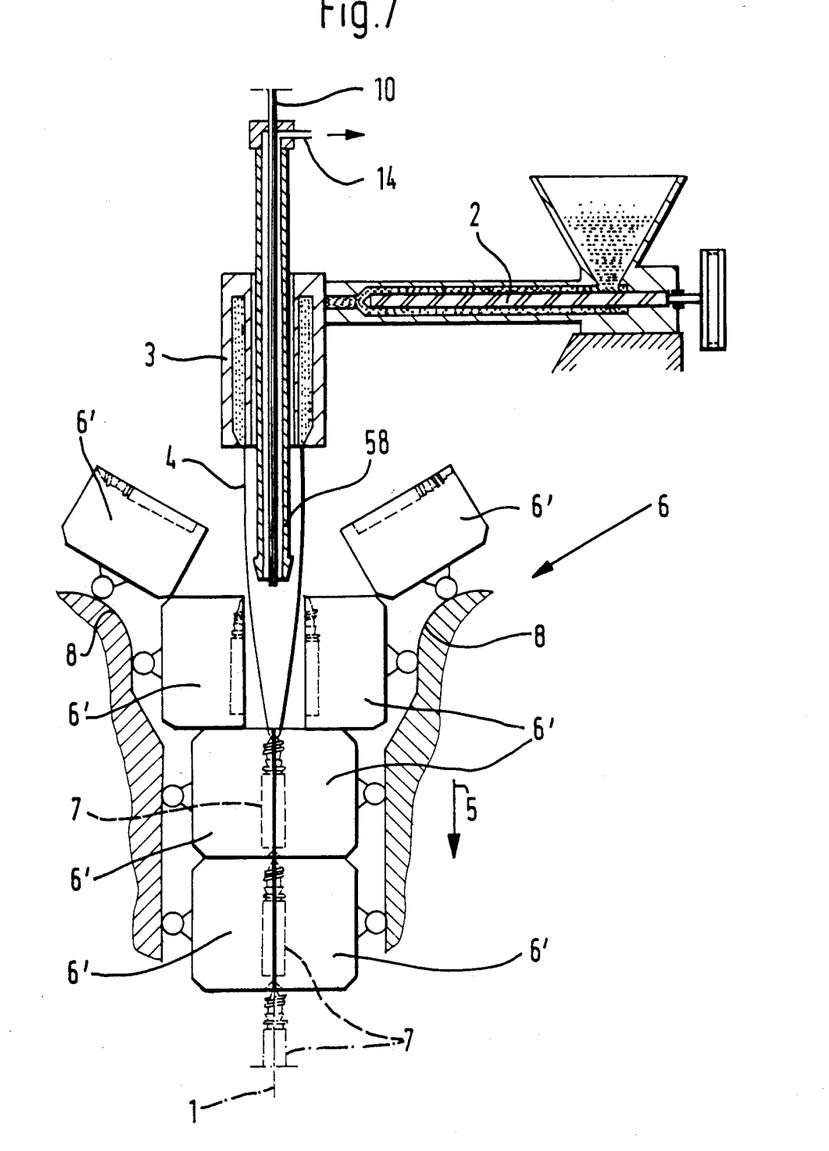
FIG. 7 is a diagrammatic, simplified side elevation view in partial section illustrating interaction of the extrusion head and the molding assembly for forming the plastic strip of receptacles.

Fourteen filler mandrels 58 (see FIGS. 2 and 7) are also provided to facilitate the simultaneous filling of all fourteen ampoules 7. The filler mandrels penetrate bores 59 arranged in series (in a row), along the central separation plane extending through tube head 3 between its halves 26 and 27, and are arranged longitudinally. The bottom ends of bores 59 lie in the middle between longitudinal sides 23 of annular opening 21, so that the free bottom ends of filler mandrels 58 extend into the middle inside the flat tube 4 surrounding them and towards the molding assembly 6, as shown in FIG. 7. A filler mandrel connection 10 and an exhaust air connection 14 are provided at the top end of each filler mandrel 58 in the traditional manner, as illustrated in FIG. 7.

Figure 4:
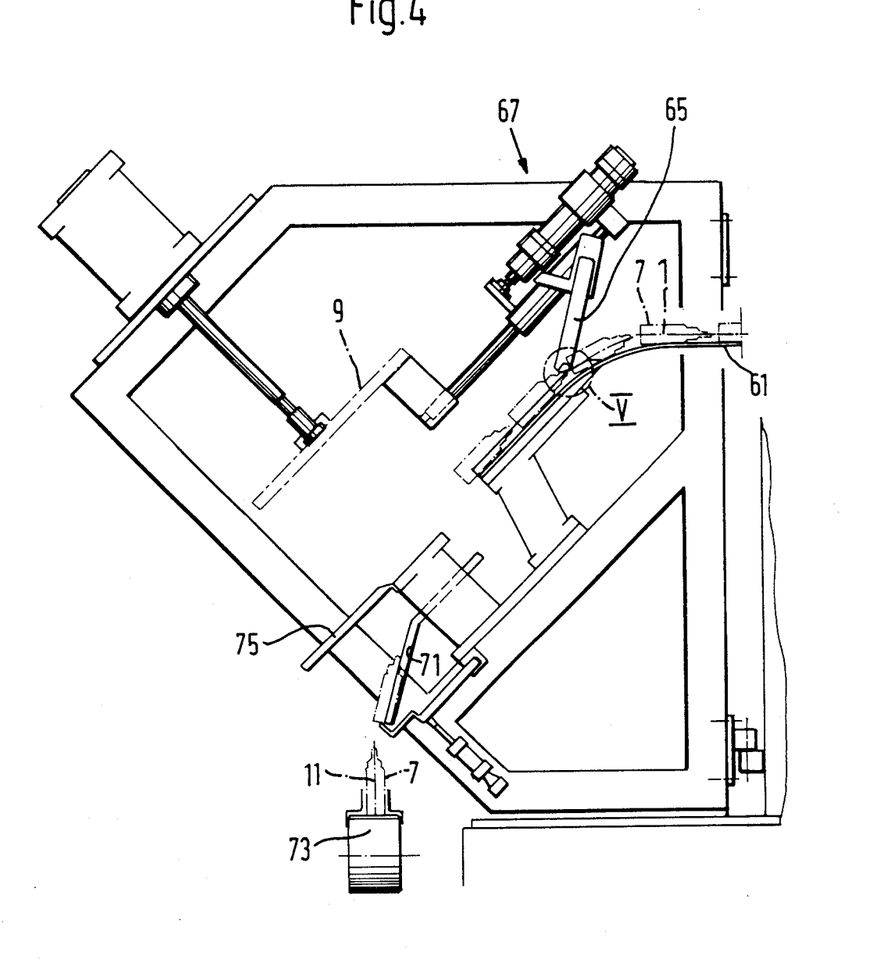
FIG. 4 is a diagrammatic side elevational view, in smaller scale, of a punching device according to the present invention.
Figure 5:
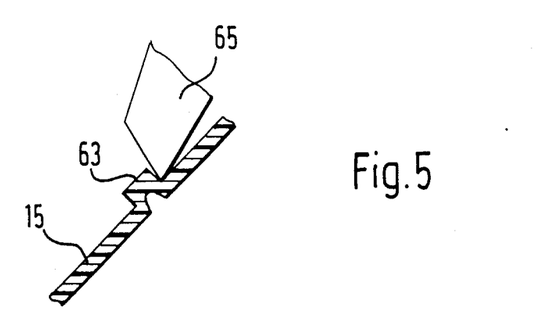
FIG. 5 is an enlarged detailed side elevational view of area V in FIG. 4, illustrating the engagement between a thrust member and a plastic strip of receptacles.

The plastic strip 1 of receptacles, emanating from molding assembly 6 with filled and closed ampoules 7, is transported on a conveyor 61 to the punching device 9 as shown in FIG. 4. To control the thrust movement in the punch device timing relative to the welding and filling operations taking place in molding assembly 6 and to bring receptacle groups 11 of the strip 1 into punching device 9 in the correct working position, plastic strip 1 is thrust forward by means of configurational irregularities forming shoulders 63 (FIGS. 5 and 6). Shoulders 63 are shaped on strip 1 in molding assembly 6 on both sides and are incorporated into side flanges or shavings 15. The shoulders are produced in predetermined positions relative to each adjacent group 11 of ampoules 7. The shoulders 63 cooperate with thrusting grapple claws 65 aligned on the strip sides. Each claw 65 is arranged on one or the other side of receptacle strip 1, in alignment with shoulders 63, and can be driven in steps by a thrust device 67 as indicated in FIG. 4. The engagement of one of the thrusting grapple claws 65 with one of the shoulders 63 is shown in the enlarged representation of FIG. 5. Following each thrust step into punching device 9, an individual receptacle group 11 is punched out by suitable cutting blades, and then is moved through a product chute 71 to a product conveyor 73 to be discharged. The waste shavings remaining in punching device 9 are discharged through a waste chute 75.

The irregularities forming the shoulders 63 can project from the plastic strip side edges as shown in FIG. 5. Alternatively, the shoulders can be formed by depressions or cutouts in the strip side edges.

In performing the method, the molten plastic material in extruder 2 is pressed through bores 29 into tube head 3. A first uniform distribution of the plastic material along the entire length of both of the halves 26 and 27 occurs with the aid of the obliquely extending traps 35. The uniformity of the distribution is attained by corresponding adjustment of ram bolts 37. As a result of constriction 39 providing a tightly adjusted throttling of the crevice, a general pressure compensation of the material occurs in the discharge area from each trap 35.

Another compensation of the plastic flow is attained by the corresponding suitable adjustment of sliding plugs 41. Each sliding plug 41 forms an adjustable throttle area in the crevice, whereby an independent adjustment of various areas is possible over the entire length of the longitudinal sides 23 of annular opening 21. In other words, various zones of the flow of plastic material can be influenced independently from each other by sliding plugs 41, so that the supply of plastic to the individual longitudinal segments of the longitudinal sides 23 of annular opening 21 can be adjusted. An adjustment in the area of the short sides 24 of annular opening 21 is obtained by means of sliding plugs 45. At last fine adjustment of the wall thickness of the already formed flat tube 4 is obtained by adjustment of border strips 51, engaging slot 33, by the use of compression screws 57. The contour of slot 33 can be shaped differently in its various longitudinal segments, since a plurality of compression screws 57 are distributed over the length of each border strip 51. This distribution of screws 57 makes it possible to prebias strip 51, for instance, at one end more strongly than at the other end. Control of these numerous adjustments relative to one another can guarantee that flat tube 4 has uniform wall thickness around its entire periphery and a uniform or constant discharge velocity or speed from slot 33.

Tube head 3 can be heated by electric heating elements 77 mounted on the outside of the unit. The electric connections 79 of heating elements 77 are shown in the drawing only partially in the interest of clarity of representation. When the energy supply to the individual heating elements 77 is controlled individually over connections 79, with on site adjustment of different temperature values at tube head 3, a further fine control of the uniformity of the plastic flow at extrusion slot 33 can be attained. Tube head 3 can be modified so that it is suitable for coextrusion, whereby it can be fed from a plurality of extruders, of that a multiplate or multilayer flat tube is cast.

Individual ampoules 7 could also be pressed out of plastic strip 1 in punching device 9, instead of punching out receptacle groups 11. The ampoules can subsequently be packaged individually. The waste shavings remaining in punching device 9, following the punching operation, can be comminuted in the area of the punching device, and, immediately recycled.

While a particular embodiment has been chosen to illustrate the invention, it will be understood by those skilled in the art that various changes and modifications can be made therein without departing from the scope of the invention as defined in the appended claims.

What is claimed is:

1. A method for producing liquid filled receptacles of thermoplastic material, comprising the steps of:
   extruding plastic material into a broad, flat tube between walls of a molding assembly;
   exerting differential pressure on walls of the tube such that the tube engages the mold assembly walls to form a receptacle strip having a plurality of small receptacles adjacent one another;
   filling each small receptacle substantially simultaneously with a liquid through a movable separate, associated filler mandrel, the filler mandrels being moved within the tube extending within the molding assembly to fill the small receptacles; and
   closing the small receptacles after filling by welding selected wall segments of the tube.

2. A method according to claim 1 wherein configurational irregularities are formed on at least one longitudinal side edge of the receptacle strip by the molding assembly, the configurational irregularities being located in predetermined positions relative to and adjacent to groups of the small receptacles; and
   the configurational irregularities are for positioning and for controlling a time thrust movement of the receptacle strip from a filling and welding station to a punching device which separates the side edges of the receptacle strip as shavings.

3. A method according to claim 2 wherein the configurational irregularities form shoulders that mechanically engage a movable thrust member to convey the receptacle strip toward the punching device.

4. An extrusion head apparatus for producing a tube to make liquid filled receptacles of thermoplastic material, comprising:
   at least one inner flow passage for supplying flowable thermoplastic material;
   an extrusion slot in fluid communication with said flow passage, said extrusion slot being an elongated annular opening adapted to a cross-sectional configuration of the tube with substantially straight longitudinal sides connected at adjacent ends thereof by short, curves sides;
   a series of bores extending completely through the extrusion head apparatus and having bottom ends between said longitudinal sides of said annular opening;
   longitudinally movable filler mandrels arranged in said bores; an
   a plurality of flow control means for regulating thermoplastic material flow through said passage and selectively influencing flowing zones of the thermoplastic material flow in various longitudinal segments of said longitudinal sides of said annular opening, said flow control means including adjustment for means for independently adjusting at least some of said control means relative to the other control means, each of said flow control means being arranged in a selected position.

5. An extrusion head apparatus according to claim 4 wherein said flow control means comprises at least one adjustable control means for regulating the thermoplastic material flow at said short sides of said annular opening, and for regulating the thermoplastic material flow in said flow passage toward said various longitudinal segments of said longitudinal sides of said annular opening.

6. An extrusion head apparatus according to claim 4 wherein said flow passage comprises a fixed stationary constriction locally throttling thermoplastic material flow therein.

7. An extrusion head apparatus according to claim 4 wherein said flow passage comprises a narrow, uninterrupted crevice upstream of said annular opening and a plurality of relatively wide flow traps offsetly arranged relative to each other around an upstream peripheral edge of said crevice for feeding the thermoplastic material to said crevice, each of said flow traps having a longitudinally adjustable ram bolt at an inlet area thereof controlling the thermoplastic material flow into each said flow trap.

8. An extrusion head apparatus according to claim 7 wherein said annular opening has a discharge end defined by movable border strips surrounding said annular opening on each of said longitudinal sides thereof and by a facing end inner wall, said border strips being coupled to adjustable setting screws for varying spacing between said border strips and said inner wall.

9. An extrusion head apparatus according to claim 8 wherein said crevice comprises a small cross-sectional segment adjacent said border strips and a plurality of sliding plugs arranged offset from each other about said crevice to vary sizes of said small cross-sectional segment, each of said sliding plugs being coupled to a setting screw for positioning the respective sliding plug, at least one of said sliding plugs being arranged to regulate the thermoplastic material flow to each of said short sides of said annular opening through said crevice.

10. An extrusion head apparatus according to claim 7 wherein each of said flow traps comprises a constriction at a discharge area thereof.

* * * * *